US012587457B2

(12) United States Patent
Essa et al.

(10) Patent No.: US 12,587,457 B2
(45) Date of Patent: Mar. 24, 2026

(54) SYSTEMS AND METHODS FOR CALCULATING A SYNTHETIC DATA ERROR FACTOR TO SIMULATE MISSING NETWORK ELEMENT DATA

(71) Applicant: VERIZON PATENT AND LICENSING INC., Basking Ridge, NJ (US)

(72) Inventors: Ammara Essa, Los Angeles, CA (US); Timothy E. Coyle, Chicopee, MA (US); Hector Alejandro Garcia Crespo, North Richland Hills, TX (US); Matthew Kapala, North Billerica, MA (US); Jason A. Birr, Lithia, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 25 days.

(21) Appl. No.: 18/738,349

(22) Filed: Jun. 10, 2024

(65) Prior Publication Data

US 2025/0379805 A1     Dec. 11, 2025

(51) Int. Cl.
| | |
|---|---|
| *H04L 43/04* | (2022.01) |
| *H04L 41/16* | (2022.01) |
| *H04L 43/02* | (2022.01) |

(52) U.S. Cl.
CPC .............. *H04L 43/04* (2013.01); *H04L 41/16* (2013.01); *H04L 43/02* (2013.01)

(58) Field of Classification Search
CPC ......... H04L 43/04; H04L 41/16; H04L 43/02; G06N 20/00; G06F 18/15
See application file for complete search history.

(56) References Cited

U.S. PATENT DOCUMENTS

| | | | | |
|---|---|---|---|---|
| 8,843,423 | B2 * | 9/2014 | Chu ....................... | G06N 5/025 |
| | | | | 706/45 |
| 2017/0147930 | A1 * | 5/2017 | Bellala ..................... | G06N 5/04 |
| 2018/0081914 | A1 * | 3/2018 | Zoll .................... | G06F 11/3452 |
| 2024/0069874 | A1 * | 2/2024 | Li ........................... | G06N 20/00 |
| 2024/0296328 | A1 * | 9/2024 | Park ........................ | G06N 3/08 |

* cited by examiner

*Primary Examiner* — Johnny B Aguiar

(57) ABSTRACT

The techniques described herein relate to a method that involves identifying a set of network elements with less than a specified percentage of missing data, removing a percentage of data to create a test data set for each network element, applying various data fill methods to the test data set to generate filled data sets, calculating the percentage of missing data successfully filled and the error between the filled data and the removed data for each data fill method, analyzing the relationships between the percentage of missing data, the percentage of successfully filled data, and the error to generate error curves for each data fill method, and selecting one or more data fill methods to apply to missing data in a network element based on the corresponding error curves.

20 Claims, 4 Drawing Sheets

SYSTEMS AND METHODS FOR CALCULATING A SYNTHETIC DATA ERROR FACTOR TO SIMULATE MISSING NETWORK ELEMENT DATA

BACKGROUND

In the field of network management and optimization, network elements, such as cell towers, base stations, and network switches, generate vast amounts of data in the form of key performance indicators (KPIs) that reflect various aspects of their performance, including throughput, latency, and error rates. This data is used for monitoring network health, detecting anomalies, and making decisions to optimize network performance.

DETAILED DESCRIPTION

The presence of missing or incomplete network data, due to factors such as system outages or data collection issues, can pose challenges in accurately assessing network performance and applying advanced analytics techniques, such as machine learning, to derive insights and perform network optimization. The techniques described herein relate to a method that involves identifying a set of network elements with less than a specified percentage of missing data (ideally but not necessarily 0% missing data), removing a percentage of data to create a test data set for each network element, applying various data fill methods to the test data set to generate filled data sets, calculating the percentage of missing data successfully filled and the error between the filled data and the removed data for each data fill method, analyzing the relationships between the percentage of missing data, the percentage of successfully filled data, and the error to generate error curves for each data fill method, and selecting one or more data fill methods to apply to missing data in a network element based on the corresponding error curves.

The method involves fitting a curve to the calculated percentage of missing data successfully filled and the error for each data fill method during the relationship analysis. The fitted curve is used to calculate a synthetic data error factor that quantifies the total error introduced by a data fill method. The method also involves incrementing the percentage of data removed and generating relationships between the percentage of missing data and the percentage of missing data successfully filled. The method may further include selecting a data fill method to apply to a network element based on the generated error curves, applying the selected data fill method to missing data in the network element to generate filled data, training a machine learning model using the filled data, and evaluating the performance of the machine learning model on a test set of data from the network element. If the machine learning model's performance is below a predefined threshold, the method involves selecting a different data fill method based on the error curves and re-evaluating the model's performance. The selection of the data fill method is based on one or more factors, including but not limited to the error curve for each data fill method, the computational complexity of each data fill method, the runtime of each data fill method, and the characteristics of the network element.

Devices including processors for performing the above method, as well as non-transitory computer-readable storage media for tangibly storing computer program instructions capable of being executed by a computer processor, the computer program instructions defining steps of the method are likewise disclosed, among other implementations.

Figure 1:
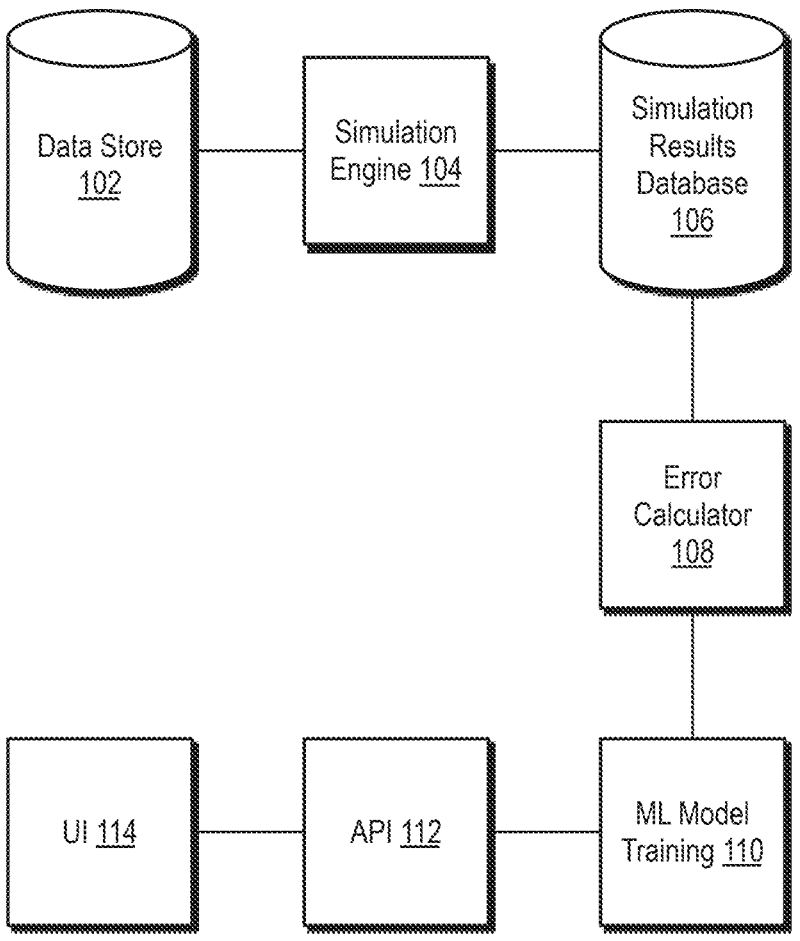
FIG. 1 illustrates a system for simulating utilizing data fill for a network element according to some of the disclosed embodiments.

FIG. 1 illustrates a system for simulating utilizing data fill for a network element according to some of the disclosed embodiments.

As illustrated, the. system includes a data store 102, a simulation engine 104, a simulation results database 106, an error calculator 108, a machine learning model training component 110, an application programming interface (API) 112, and a user interface (UI) 114.

In some implementations, data store 102 is responsible for storing and managing the historical key performance indicator (KPI) data associated with various network elements. This data store can be implemented using various database technologies, such as relational databases (e.g., MySQL®, PostgreSQL®), NoSQL databases (e.g., MongoDB®, Cassandra®), or distributed file systems (e.g., Hadoop® Distributed File System). The choice of database technology is not limiting and may depend on factors such as the volume, variety, and velocity of the data, as well as the required scalability and performance on a per-element or per-network basis. In some implementations, the type of data store 102 can be selected to handle large amounts of time-series data efficiently, allowing for fast querying and retrieval of historical KPI data for analysis and simulation purposes.

In some implementations, simulation engine 104 can simulate the performance of different data fill methods under various scenarios of missing data. The simulation engine can be implemented using high-performance computing frameworks, such as Apache® Spark® or Apache® Flink®, which allow for distributed processing of large datasets. In some implementations, simulation engine 104 can read historical KPI data from data store 102 and apply different data fill methods to simulate missing data scenarios, as described more fully in FIG. 2. In some implementations, simulation engine 104 can utilize techniques such as random sampling, stratified sampling, or time-based splitting to create subsets of data with varying levels of missing data. In some implementations, simulation engine 104 then can apply the selected data fill methods, such as interpolation, extrapolation, machine learning-based imputation, or domain-specific methods, to fill in the missing data points. In some implementations, simulation results, including the filled data and the corresponding error metrics, are stored in the simulation results database 106 for further analysis.

In some implementations, simulation results database 106 stores the output generated by simulation engine 104. In some implementations, database 106 can be implemented using similar technologies as data store 102, depending on the volume and structure of the simulation results, the details of which are not repeated herein. The simulation results database 106 can store and retrieve the filled data, along with the associated error metrics and metadata, such as the data fill methods used, the percentage of missing data, and the network element information. In some implementations, simulated results database 106 can support fast querying and aggregation operations to facilitate the analysis and comparison of different data fill methods across various scenarios.

In some implementations, error calculator 108 can calculate the error metrics between the true values and the filled values generated by the simulation engine. In some implementations, error calculator 108 can be implemented using statistical libraries and frameworks, such as NumPy®, SciPy®, or Pandas®, which provide functions for calculating various error metrics, such as absolute percentage error, mean squared error, or root mean squared error. In some implementations, error calculator 108 retrieves the simulation results from the simulation results database 106 and compares the filled values against the true values to compute the error metrics. In some implementations, error calculator 108 can perform these calculations at different levels of granularity, such as individual data points, hourly averages, or daily aggregates, depending on the requirements of the downstream applications. The calculated error metrics are then stored back in the simulation results database 106 for further analysis and visualization.

In some implementations, the error calculator 108 can perform a curve fitting process, which involves analyzing the relationships between the percentage of missing data, the fill percentages, and the error metrics. The error calculator can leverage statistical libraries and frameworks, such as SciPy®, which provide functions for various regression techniques, including linear regression, polynomial regression, and spline interpolation. To establish mathematical functions that describe the performance of each data fill method, the error calculator retrieves the simulation results and error metrics from the simulation results database and applies the appropriate regression techniques. It can also incorporate regularization techniques, such as Lasso or Ridge regression, to prevent overfitting and ensure the generalizability of the fitted curves. The error calculator can optimize the regression parameters using techniques like least squares or maximum likelihood estimation, and it can assess the goodness of fit using metrics such as R-squared or mean squared error. Once the curve fitting process is complete, error calculator 108 stores the resulting fitted curves and their coefficients back in the simulation results database 106. These fitted curves can then be accessed by other components, such as the API 112 or UI 114, for further analysis, visualization, and decision-making purposes, such as selecting the most appropriate data fill methods for a given network element based on the expected levels of missing data and the desired accuracy of the imputed values In some implementations, machine learning model training component 110 utilizes the filled data generated by the simulation engine to train machine learning models for various tasks, such as anomaly detection, performance prediction, or resource optimization. Machine learning model training component 110 can be implemented using popular machine learning frameworks, such as TensorFlow®, PyTorch®, etc. In some implementations, the training process involves retrieving the filled data from the simulation results database, preprocessing the data (e.g., normalization, feature scaling), splitting the data into training and validation sets, and applying appropriate machine learning algorithms to learn patterns and relationships in the data. In some implementations, the trained models can be evaluated using the error metrics calculated by error calculator 108 to assess their performance on the filled data. In some implementations, machine learning model training component 110 can also incorporate techniques such as cross-validation, hyperparameter tuning, and ensemble methods to improve the robustness and generalization ability of the trained models.

In some implementations, API 112 serves as an interface between the backend components (e.g., simulation engine 104, error calculator 108, machine learning model training component 110) and the user-facing applications. API 112 can define endpoints, handle requests, and return responses in a standardized format (e.g., JavaScript Object Notation (JSON)). API 112 exposes various functionalities of the system, such as initiating simulations, retrieving simulation results, accessing error metrics, and interacting with the trained machine learning models. It can also implement authentication and authorization mechanisms to ensure secure access to the system's resources. API 112 acts as a bridge between the backend processing and the frontend user interface, enabling seamless integration and communication between the different components of the system.

In some implementations, UI 114 provides a user interface for interacting with the system and visualizing the results of the simulations and analyses. In some implementations, UI 114 can be implemented using web technologies, such as Hyper Text Markup Language (HTML), Cascading Style Sheets (CSS), and JavaScript®. In some implementations, UI 114 communicates with the backend components through API 112, sending requests and receiving responses to display the relevant information to the users. In some implementations, UI 114 can offer features such as selecting network elements, configuring simulation parameters, choosing data fill methods, and visualizing the error curves and performance metrics. It can also provide interactive dashboards and charts to help users explore and compare the results of different data fill methods across various scenarios.

As illustrated, data store 102 provides the historical KPI data to simulation engine 104, which generates the filled data and stores the simulation results in simulation results database 106. Error calculator 108 retrieves the simulation results, calculates the error metrics and curves, and stores them back in the simulation results database 106. ML model training component 110 uses the filled data from the simulation results database to train machine learning models. API 112 exposes the functionalities of the backend components to the UI 114, which allows users to interact with the system, initiate simulations, and visualize the results. Details of the functional aspects of these components are described in more detail next with respect to FIGS. 2 and 3.

Figure 2:
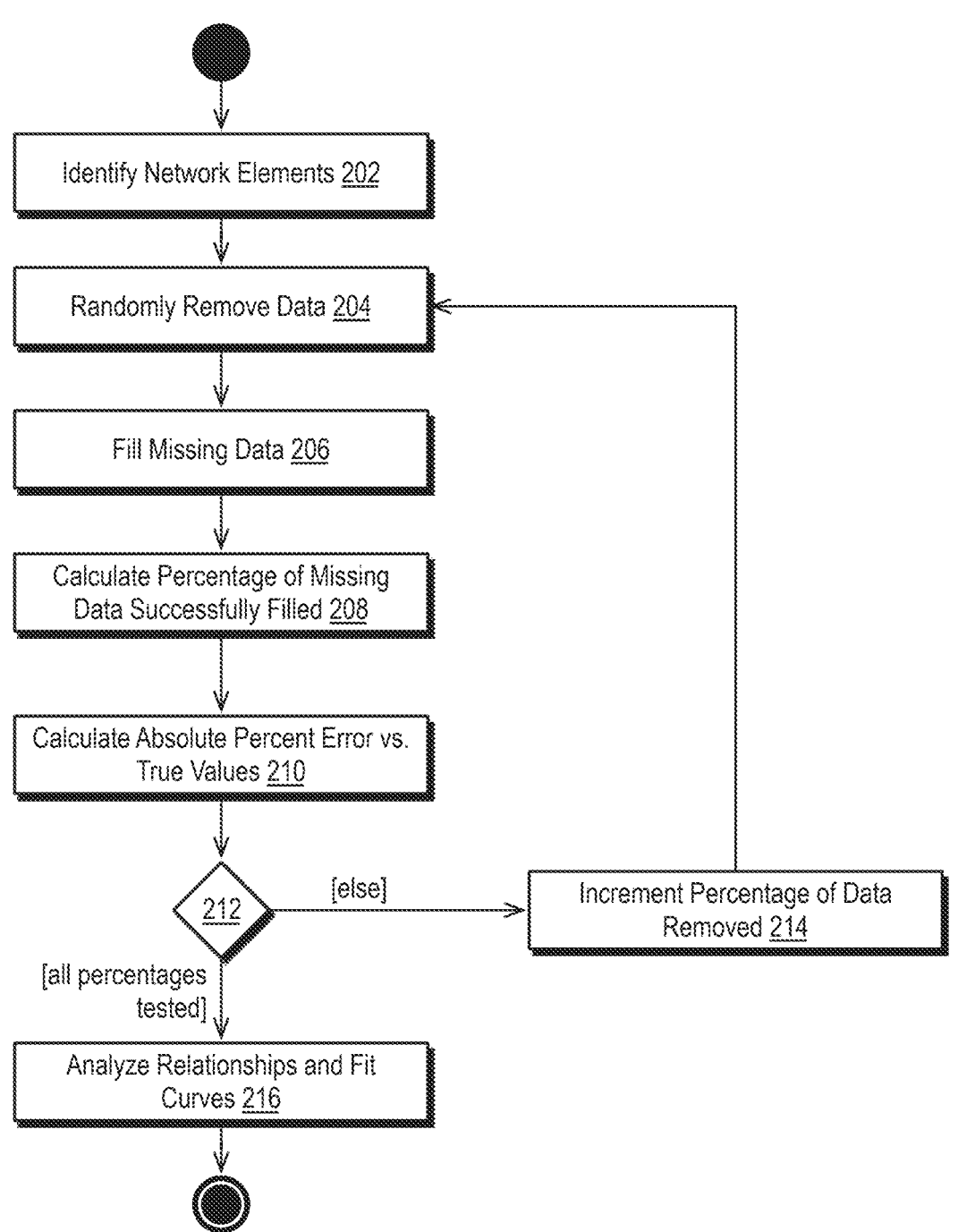
FIG. 2 illustrates a method for simulating and analyzing the performance of different data fill methods to generate error curves that can be used to select the most appropriate fill methods for a given network element.

FIG. 2 illustrates a method for simulating and analyzing the performance of different data fill methods to generate error curves that can be used to select the most appropriate fill methods for a given network element.

In step 202, the method can include identifying network elements with less than a specified percentage of missing data.

In some implementations, this step filters network elements to ensure that the simulation is performed on network elements that have a sufficient amount of historical data to serve as a baseline for evaluating the accuracy of the data fill methods. In some implementations, the value of the specified percentage can be determined based on factors including, without limitation, a desired accuracy of the simulation, the available computational resources, and the specific requirements of the downstream machine learning applications.

To identify network elements with less than the specified percentage of missing data, the method may include analyzing historical key performance indicator (KPI) data (as discussed in FIG. 1). In some implementations, this analysis can be performed using data preprocessing techniques implemented using tools such as APACHE SPARK®, which allows for efficient processing of large datasets. The preprocessing stage may involve cleaning the data, handling outliers, and aggregating the data at a suitable granularity (e.g., daily or hourly intervals) to facilitate the identification of network elements with sufficient historical data.

As described in more detail in FIG. 1, a network element refers to a specific component or device within a telecommunications network, such as but not limited to a cell tower, a base station, or a network switch. In some implementations, a given network element can be associated with a set of KPIs that measure various aspects of its performance, such as throughput, latency, or error rates. In some implementations, a set of network elements may include multiple instances of the same type of element (e.g., multiple cell towers) or a combination of different types of elements that work together to provide network services.

In some implementations, when analyzing historical KPI data, the method may consider the relationships between network elements and their associated KPIs. For example, if a particular cell tower (a network element) has a high percentage of missing data for a specific KPI, it may be excluded from the simulation. However, if the majority of cell towers in a given region have sufficient historical data, the method may proceed with the simulation for that set of network elements. In some implementations, by considering the relationships between network elements and their associated KPIs, the method aims to perform the simulation on a sample of the network that is representative of the overall network characteristics and behavior.

In step 204, once the network elements with less than the specified percentage of missing data have been identified, the method can include removing a second percentage of data for each device associated with the selected network elements. In some implementations, the method can utilize a random or pseudo-random selection process to remove the second percentage of data for each device associated with the selected network elements.

In some implementations, step 204 can simulate the scenario of missing data that the data fill methods will aim to address. In some implementations, the value of the second percentage can be varied to evaluate the performance of the data fill methods under different levels of missing data. In some implementations, the random removal of data can be performed using statistical sampling techniques, such as simple random sampling or stratified sampling, to ensure that the removed data points are representative of the overall data distribution. The removed data points are stored separately to serve as the ground truth for evaluating the accuracy of the data fill methods in subsequent steps.

In some implementations, the removed data points can be stored separately to serve as the ground truth for evaluating the accuracy of the data fill methods in subsequent steps. This ground truth data can allow for a direct comparison between the original values and the values estimated by the data fill methods, enabling the calculation of error metrics such as absolute percentage error (as described in step 210).

In step 206, the method can include filling in the missing data using different data fill methods.

In some implementations, these methods can include various techniques such as interpolation, extrapolation, machine learning-based imputation, or domain-specific methods tailored to the characteristics of the network element data. The choice of data fill methods can be based on factors such as the data type (e.g., numeric, categorical), the temporal patterns in the data, and the computational complexity of the methods.

Some specific data fill methods that can be used include, but are not limited to, forward fill and back fill, which involve filling missing data points with the last known value before the gap or the first known value after the gap, respectively; mean element type fill, which involves filling missing data points with the mean value of the corresponding network element type; mean time-shifted window fill, which involves filling missing data points with the mean value of a time-shifted window, such as the same day of the week from previous weeks; random distribution fill, which involves filling missing data points with values randomly sampled from a specified distribution; normal distribution fill, which involves filling missing data points with values sampled from a normal distribution based on the mean and standard deviation of the available data; and statistical time-bounded KPI profiles, which involve filling missing data points using statistical profiles of the KPIs bounded by specific time periods.

In some implementations, the data fill methods can be implemented using a combination of statistical libraries and/or machine learning frameworks to leverage their built-in functionality for handling missing data. The implementation may involve preprocessing the data, selecting appropriate hyperparameters for each method, and applying the methods to the missing data points.

In some implementations, the method can utilize a staggered approach to data filling, where multiple data fill methods can be used in sequence. For example, if the first data fill method does not successfully fill all missing data points, the remaining missing data can be passed to a second data fill method, and so on. This staggered approach enables the use of multiple methods with different strengths to maximize the coverage and accuracy of the data filling process.

In some implementations, the data fill methods can be further enhanced by incorporating advanced statistical techniques and machine learning algorithms. For instance, time series forecasting models (e.g., Autoregressive Integrated Moving Average (ARIMA), Long Short-Term Memory (LSTM)) could be used to predict missing values based on historical patterns, or clustering algorithms (e.g., k-means, hierarchical clustering) could be employed to group similar network elements and leverage their collective behavior to fill missing data points.

In step 208, the method can include calculating the percentage of missing data that was successfully filled by each data fill method.

In some implementations, this step assesses the coverage of each method in terms of its ability to provide a non-null value for the missing data points. The calculation can be performed by comparing the number of filled data points against the total number of missing data points for each method. In some implementations, the percentage of successfully filled data points can be used as a metric to evaluate the effectiveness of each data fill method in handling different levels of missing data. In some implementations, data fill methods with higher fill percentages may indicate a better ability to estimate missing values based on the available data.

In some implementations, the percentage of missing data successfully filled can be calculated for each network element individually. This may allow for a more granular assessment of the data fill methods' performance, as different network elements may have varying patterns of missing data and respond differently to each method. By analyzing the fill percentages at the network element level, the method can identify which data fill methods are most effective for specific types of network elements or data patterns.

In some implementations, the percentage of missing data successfully filled can be calculated at different levels of data aggregation, such as hourly, daily, or weekly intervals. This enables the evaluation of the data fill methods' performance across different time scales, which can be relevant for downstream applications that require data at various granularities. By assessing the fill percentages at multiple levels of aggregation, the method can ensure that the selected data fill methods are effective for the specific requirements of the intended use case.

In some optional implementations, the results of step 208 can be visualized using graphs or charts that display the fill percentages for each data fill method across different levels of missing data. These visualizations can aid in the identification of patterns, the comparison of performance across different methods, and the presentation of the data fill results. For example, a line graph could be used to show the fill percentages for each method as the percentage of missing data increases, allowing for a clear comparison of their effectiveness at handling different levels of data sparsity.

In step 210, the error between the true values (stored separately in step 204) and the filled values is calculated for each data fill method.

In some implementations, the error can be an absolute percentage error between the filled values and the calculated values. In some implementations, step 210 can evaluate the accuracy of the filled values by comparing them against this ground truth data. In some implementations, the absolute percentage error can be calculated by taking the absolute difference between the actual value and the filled value, dividing it by the actual value, and multiplying by 100. In some implementations, this metric can provide a standardized measure of the error, allowing for comparison across different data fill methods and network elements.

In addition to the absolute percentage error, other error metrics can be employed to assess the accuracy of the data fill methods. For example, the mean squared error (MSE) or root mean squared error (RMSE) can be used to measure the average magnitude of the errors, giving more weight to larger deviations. The choice of error metric may depend on the specific requirements of the application and the desired emphasis on different types of errors.

In some implementations, the error calculation can be performed at different levels of granularity, such as individual data points, hourly averages, or daily aggregates. In some implementations, the error metrics calculated in step 210 can be used to identify the most accurate data fill methods for each network element or group of network elements. By comparing the errors across the different methods, the system can determine which of its methods consistently produces the lowest errors and is best suited for filling in missing data in specific contexts.

In step 212, the method can include determining if all desired percentages of removed data have been tested. If not, the method proceeds to step 214, where the percentage of removed data is incremented, and the process returns to step 204 to randomly remove the new percentage of data from the original dataset and repeat the subsequent steps.

In some implementations, the range of percentages to be tested can be determined based on the expected levels of missing data in the production environment and the desired granularity of the error curves. For example, the method may test percentages ranging from 0% to 50% in increments of 5%, covering a range of missing data scenarios. The specific range and increment values can be adjusted based on the characteristics of the data and the requirements of the application.

In some implementations, the decision to proceed with further iterations can be based on a predefined list of percentages to be tested. For example, the system may be configured to test a specific set of percentages, such as [0%, 1%, 5%, 10%, 15%, 20%, 25%, 30%, 40%, 50%, 60%, 75%], to cover a range of scenarios with varying levels of granularity. This approach can ensure that the error curves are generated for a comprehensive set of missing data levels.

In some implementations, the decision to proceed with further iterations can be based on a convergence criterion. For example, the method may continue to increment the percentage of removed data until the change in the error metrics falls below a specified threshold. This approach ensures that the error curves are generated until a sufficient level of stability or convergence is achieved, indicating that further increases in the percentage of removed data are unlikely to provide significant additional insights.

In some implementations, the increments in the percentage of removed data can be adaptive, based on the observed changes in the error metrics. For example, if the error metrics show a rapid increase or decrease between two consecutive percentages, the method may reduce the increment size to capture more granular variations in that region of the error curve. Conversely, if the error metrics remain relatively stable across multiple percentages, the method may increase the increment size to efficiently explore a wider range of scenarios.

If all desired percentages of removed data have been tested, the method proceeds to step 216, where the relationships between the percentage of missing data, the fill percentages, and the error metrics are analyzed. This step can include fitting curves to the collected data points to establish mathematical functions that describe the performance of each data fill method.

In some implementations, the curve fitting process can be performed using various regression techniques, such as linear regression, polynomial regression, spline interpolation, or other suitable methods, depending on the observed patterns in the data. The choice of regression technique may be based on factors such as the complexity of the relationships, the desired level of smoothness, and the interpretability of the resulting curves. The fitted curves provide a continuous representation of the relationship between the percentage of missing data and the expected error for each data fill method. The coefficients of these fitted curves can be used to calculate the synthetic data error factor, which quantifies the total error introduced by the data fill methods.

In some implementations, the curve fitting process may involve regularization techniques to prevent overfitting and ensure the generalizability of the fitted curves. Regularization methods, such as L1 (Lasso) or L2 (Ridge) regularization, can be employed to control the complexity of the curves and avoid capturing noise or spurious patterns in the data. The regularization parameters can be tuned using techniques like cross-validation to find the optimal balance between fitting the observed data and maintaining the curves' ability to generalize to unseen scenarios. The resulting coefficients of the regularized curves are then used in the calculation of the synthetic data error factor.

In some implementations, the fitted curves and their coefficients can be used to estimate the expected error for any given percentage of missing data, facilitating the selection of data fill methods for production use based on quantitative metrics and predefined criteria. Methods with lower error curves and coefficients over the range of missing data percentages can be prioritized for deployment. The synthetic data error factor, calculated using these coefficients, provides a standardized measure of the total error introduced by the selected data fill methods. The fitted curves and the synthetic data error factor can also be used to identify the optimal combination of data fill methods for different levels of missing data, enabling a dynamic and adaptive approach to data imputation.

In addition to the curve fitting, step 216 may involve further analysis to assess the impact of the data fill methods on downstream machine learning models. This can include evaluating the performance of models trained on the filled data compared to models trained on the original data (before removing data points). Metrics such as accuracy, precision, recall, F1 score, or mean squared error can be used to quantify the impact of the data fill methods on model performance. The analysis may also consider the stability and robustness of the models under different levels of missing data and various data fill methods.

In some implementations, the analysis in step 216 may also involve statistical tests or confidence intervals to assess the significance of the observed differences in performance between the data fill methods. This can help determine whether the improvements or degradations in model performance are statistically meaningful or merely due to random variations. The results of these statistical tests can inform the selection of data fill methods and guide the interpretation of the analysis outcomes.

The insights gained from the analysis in step 216 can be used to refine the data fill methods, adjust the range of percentages tested, or explore alternative methods to improve the system's overall performance. For example, if certain data fill methods consistently outperform others across different levels of missing data, those methods can be prioritized or combined in novel ways. If the analysis indicates that the performance of downstream models exhibits high sensitivity to the choice of data fill method, further research and development efforts may focus on creating imputation techniques with improved robustness and adaptability.

Figure 3:
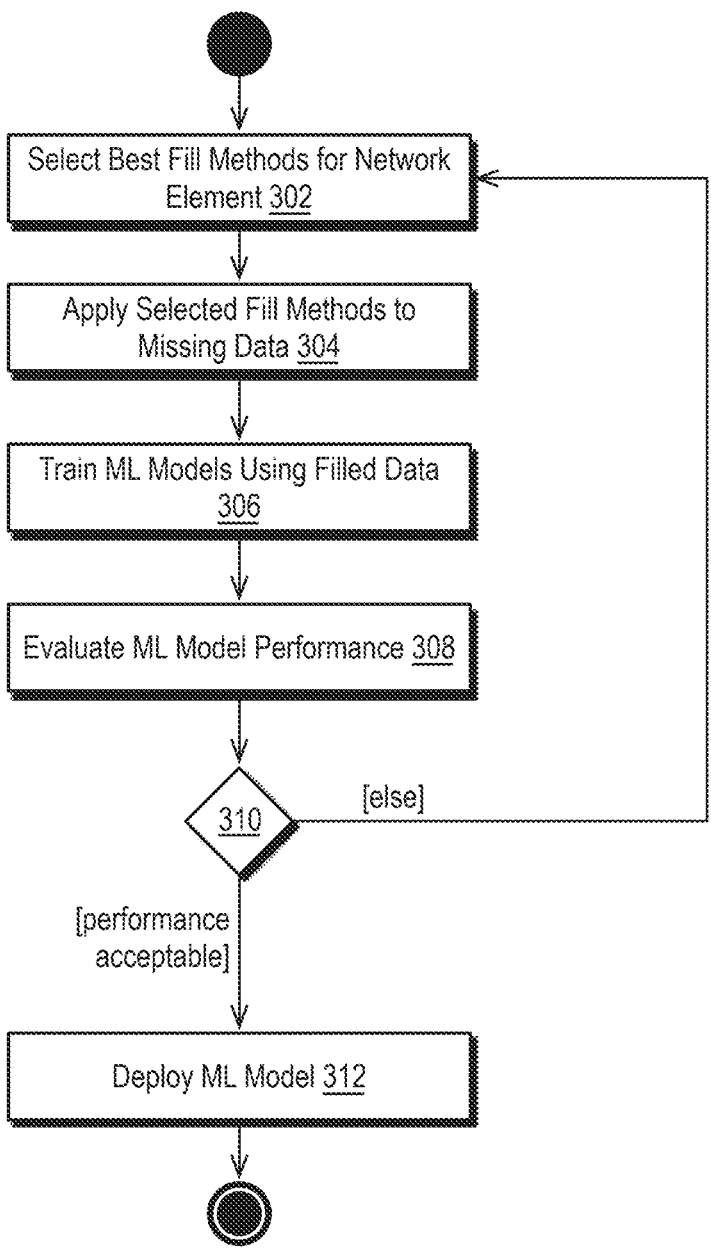
FIG. 3 illustrates a method for applying data fill error curves to select data fill methods for a network element according to some of the disclosed embodiments.

FIG. 3 illustrates a method for applying data fill error curves to select data fill methods for a network element according to some of the disclosed embodiments.

In step 302, the method can include selecting the best fill methods for a network element based on the error curves generated, as described in FIG. 2.

In some implementations, the selection process involves analyzing the error curves for each data fill method across different percentages of missing data for a given network element. As described, the error curves provide a quantitative measure of the expected error associated with each fill method for varying levels of data sparsity. By comparing the error curves, the system can identify the fill methods that result in the lowest errors across the range of missing data scenarios based on the quantitative measures provided by the error curves.

In some implementations, the selection process may consider using multiple fill methods. This approach involves applying different fill methods sequentially, where the output of one method serves as the input for the next method. For example, the method may first apply a simple fill method, such as mean imputation, to handle a portion of the missing data. Then, the remaining missing data points can be passed through more advanced fill methods, such as machine learning-based imputation or time series forecasting models. This funnel-like structure allows for the combination of different fill methods with varying levels of complexity and accuracy, leveraging their strengths to improve the overall data quality progressively. The final error factor will indicate the cumulative effect of the individual data fill methods.

In some implementations, the selection of the best fill methods may consider additional factors beyond the error curves. For example, the computational complexity and runtime of each fill method can be taken into account, particularly when dealing with large-scale datasets or real-time processing requirements. The method may rank or prioritize fill methods that optimize the trade-off between accuracy and computational efficiency, considering the constraints and requirements of production environments.

In some implementations, the selection process may involve setting thresholds or criteria based on the error curves. For instance, the method may establish an acceptable error range and select the fill methods whose error curves consistently fall within that range. Alternatively, the method may prioritize fill methods that exhibit stable performance across different percentages of missing data, indicating their robustness to varying levels of data sparsity.

In some implementations, the selection process may consider the specific characteristics and requirements of the network element. Different network elements may have distinct data patterns, dependencies, or constraints that influence the suitability of certain fill methods. For example, some network elements may have a strong temporal dependency, favoring fill methods that consider the data's time-series nature. Other network elements may have a high degree of correlation with neighboring elements, suggesting the use of spatial or contextual fill methods.

In some implementations, the selection process may involve a combination of automated and manual approaches. While the error curves provide an objective basis for comparing fill methods, domain expertise and knowledge of the specific network element can also guide the selection. Experts familiar with the network element's behavior and requirements may provide input on the suitability of different fill methods, considering factors such as interpretability, maintainability, and adherence to defined objectives.

In some implementations, the selection process may employ machine learning techniques to assist in identifying the best fill methods. For example, a meta-learning approach could be used to learn the mapping between a network element's characteristics (e.g., data distribution, missingness patterns) and the performance of different fill methods based on historical data. This learned model could then be applied to new network elements to recommend the most suitable fill methods based on their specific attributes.

In step 304, the method can include applying the selected fill methods to the missing data in a production environment.

In some implementations, the application of the fill methods can include integrating them into a data processing pipeline. In some implementations, the selected fill methods can be implemented as part of the data preprocessing stage, where they are used to impute missing values in real-time or batch processing scenarios. In some implementations, the application of the fill methods may involve adapting them to the specific characteristics of the production data. While the error curves provide a general guideline for method selection, the production data may have unique patterns, distributions, or constraints that require further customization of the fill methods. The method may include fine-tuning the hyperparameters or parameters of the selected fill methods based on the production data to optimize their performance in the real-world setting. In some implementations, the application of the fill methods may be performed incrementally or in stages. That is, instead of applying the fill methods to all missing data at once, the method may prioritize filling the most critical or recent missing values first.

In step 306, the method can include training machine learning models using the data that has been filled using the selected fill methods.

In some implementations, the filled data can be used as input features for training various machine learning models. The models can be designed to solve specific problems or tasks relevant to the network element, such as anomaly detection, performance prediction, or resource optimization. The training process can include splitting the filled data into training and validation sets, selecting appropriate model architectures and hyperparameters, and using optimization algorithms to learn the model parameters that minimize the defined loss function.

In some implementations, the training process may employ techniques to handle any remaining missing or imputed values in the filled data. For example, the method may use masking or weighted loss functions to give less importance to the imputed values during training, allowing the models to focus more on the original, non-missing data. Additionally, the method may incorporate regularization techniques to prevent the models from overfitting to the imputed values and to enhance their generalization ability.

In some implementations, the training process may leverage transfer learning or domain adaptation techniques to improve the models' performance on the filled data. If pre-trained models or knowledge from similar network elements or domains are available, the method can fine-tune or adapt those models to the specific characteristics of the current network element.

In some implementations, the selection of appropriate model architectures and hyperparameters may involve a systematic approach, such as grid search or random search, to explore different combinations and identify the best-performing models. The method may define a search space for hyperparameters based on domain knowledge, literature review, or empirical results from similar problems. The training process can then iterate over different hyperparameter configurations, evaluate their performance on the validation set, and select the optimal combination that yields the best results.

In some implementations, the training process may involve the use of ensemble techniques to combine multiple models trained on the filled data. Ensemble methods, such as bagging, boosting, or stacking, can help improve the robustness and accuracy of the predictions by leveraging the diversity and complementary strengths of different models. The method may train multiple models with different architectures, hyperparameters, or subsets of the filled data and then aggregate their predictions using techniques like majority voting, weighted averaging, or meta-learning.

In some implementations, the training process may incorporate techniques to handle class imbalance or data skewness that may arise from the filled data. If certain classes or patterns are underrepresented in the filled data, the method may employ oversampling, undersampling, or class weighting techniques to ensure that the models learn a balanced representation of the different classes. Additionally, the method may use stratified sampling techniques to ensure that the training and validation sets maintain a similar distribution of classes as the original data.

In step 308, the method can include evaluating the performance of the trained machine learning models, specifically focusing on assessing the impact of the filled data on the models' predictions.

In some implementations, the evaluation process involves applying the trained models to a separate test set or holdout dataset that was not used during training. The test set can include both original, non-missing data and data points that were imputed using the selected fill methods. In some implementations, this allows for an assessment of how well the models perform on a combination of real and filled data, simulating the scenario they would encounter in a production environment.

In some implementations, the evaluation metrics used to assess the models' performance can be tailored to the specific problem or task at hand. For example, if the models are used for anomaly detection in network elements, metrics such as precision, recall, and F1 score can be employed to evaluate the models' ability to identify anomalies in the presence of filled data accurately. If the models are used for performance prediction, metrics like mean absolute error or root mean squared error can be used to quantify the models' predictive accuracy when dealing with imputed values.

In some implementations, the evaluation process may involve comparing the performance of models trained on the filled data against baseline models trained on the original data with missing values. This comparison can help quantify the impact of the data filling process on the models' performance. If the models trained on the filled data exhibit similar or improved performance compared to the baseline models, it indicates that the selected fill methods are effective in preserving the relevant patterns and relationships in the data.

In some implementations, the evaluation process may include assessing the models' performance across different levels of data missingness. By systematically varying the percentage of missing data in the test set and evaluating the models' performance at each level, the method can determine the models' robustness to increasing amounts of imputed values. In some implementations, this analysis can aid in identifying the threshold at which the models' performance starts to degrade significantly, informing the limitations and applicability of the data filling approach.

In some implementations, the evaluation process may involve conducting sensitivity analysis to assess the impact of different fill methods on the models' predictions. By comparing the performance of models trained on data filled with different methods, the method can identify the fill methods that lead to the most accurate and stable predictions. In some implementations, this analysis can inform the optimization or selection of fill methods in subsequent iterations of the data filling process based on the quantitative evaluation of model performance.

In step 310, the method can determine if the performance of the trained models is acceptable.

In some implementations, the determination can include comparing the evaluation metrics obtained in step 308 against predefined performance thresholds or criteria. These thresholds can be based on domain knowledge, business requirements, or historical performance of similar models. If the models' performance meets or exceeds the specified criteria, the method proceeds to step 312, where the models can be deployed for the network element. If the performance is deemed unsatisfactory, the system returns to step 302 to select alternative fill methods and repeat the subsequent steps.

In some implementations, the determination may include an assessment of the models' performance, considering factors beyond the evaluation metrics. For example, the method may analyze the models' output using specific subsets of the data as input, examine the interpretability and explainability of the models' predictions, or assess the computational efficiency and scalability of the models in the production environment.

These additional considerations help in making a well-rounded decision about the acceptability of the models' performance.

In some implementations, the decision point may include a human-in-the-loop approach, where domain experts or stakeholders review the models' performance and provide their judgment or approval. The method may present the evaluation results, along with visualizations and interpretations, to the experts for their assessment. The experts can then make the final decision based on their domain knowledge and the specific requirements of the network element.

In some implementations, the determination of model performance acceptability may involve considering the trade-offs between different evaluation metrics. For example, there may be situations where a model achieves high accuracy but has lower interpretability or computational efficiency. In such cases, the method may need to prioritize the metrics based on the specific requirements and constraints of the network element. The determination process can involve a multi-criteria decision-making approach, where different metrics are weighted according to their relative importance, and a composite score is calculated to assess the overall acceptability of the model performance.

In some implementations, the determination process may involve comparing the performance of the trained models against alternative modeling approaches or benchmarks. This comparison can help assess whether the chosen modeling approach, in combination with the selected fill methods, provides superior performance compared to other commonly used techniques. If the trained models significantly outperform the alternatives, it strengthens the case for their deployment. However, if the performance gains are marginal or if simpler models achieve comparable results, it may prompt a reconsideration of the modeling approach or the fill methods used.

In some implementations, the determination process may consider the robustness and generalization ability of the trained models. This can involve evaluating the models' performance on data from different time periods, different network elements, or under different operating conditions. If the models maintain acceptable performance across these variations, it indicates their ability to generalize well to new data and handle potential changes in the production environment. On the other hand, if the models' performance deteriorates significantly under certain conditions, it may require further investigation and refinement before deployment.

In some implementations, the determination process may involve a cost-benefit analysis of deploying the trained models. This analysis can consider factors such as the expected improvements in network performance, the reduction in manual effort for data imputation, the computational resources required for model deployment, and any potential risks or uncertainties associated with the model predictions. The cost-benefit analysis can provide a quantitative assessment of the potential impact and trade-offs associated with deploying the trained models, informing the decision-making process.

In step 312, the method can include deploying the trained machine learning models for the network element in the production environment.

In some implementations, the deployment process involves integrating the trained models into the existing infrastructure and systems of the network element. This may include setting up the necessary APIs, data pipelines, and interfaces to enable the models to receive input data, generate predictions or outputs, and communicate with other components of the system. The deployment may also involve configuring monitoring and logging mechanisms to track the models' performance and behavior in real-time.

In some implementations, the deployment process may involve setting up automated decision-making or action-taking based on the models' outputs. For example, the model's predictions can be used to trigger alerts, initiate corrective actions, or optimize network resources in real-time. The deployment should establish clear rules and thresholds for automated actions, considering the potential impact and risks associated with each decision.

In some implementations, the deployment process may involve integrating the selected fill methods into the production data pipeline alongside the trained models. This integration ensures that any missing data encountered in real-time or during batch processing is automatically imputed using the chosen fill methods before being fed into the deployed models. In some implementations, the deployment process may include mechanisms for monitoring and validating the imputed values generated by the fill methods in the production environment. This can involve comparing the distribution of the imputed values against historical patterns, tracking the percentage of missing data that is successfully imputed, and detecting any anomalies or outliers in the imputed values. In some implementations, the deployment process may incorporate feedback loops to continuously improve the fill methods and the trained models. As new data becomes available in the production environment, the fill methods can be periodically re-evaluated and updated based on the latest data patterns and the models' performance.

Figure 4:
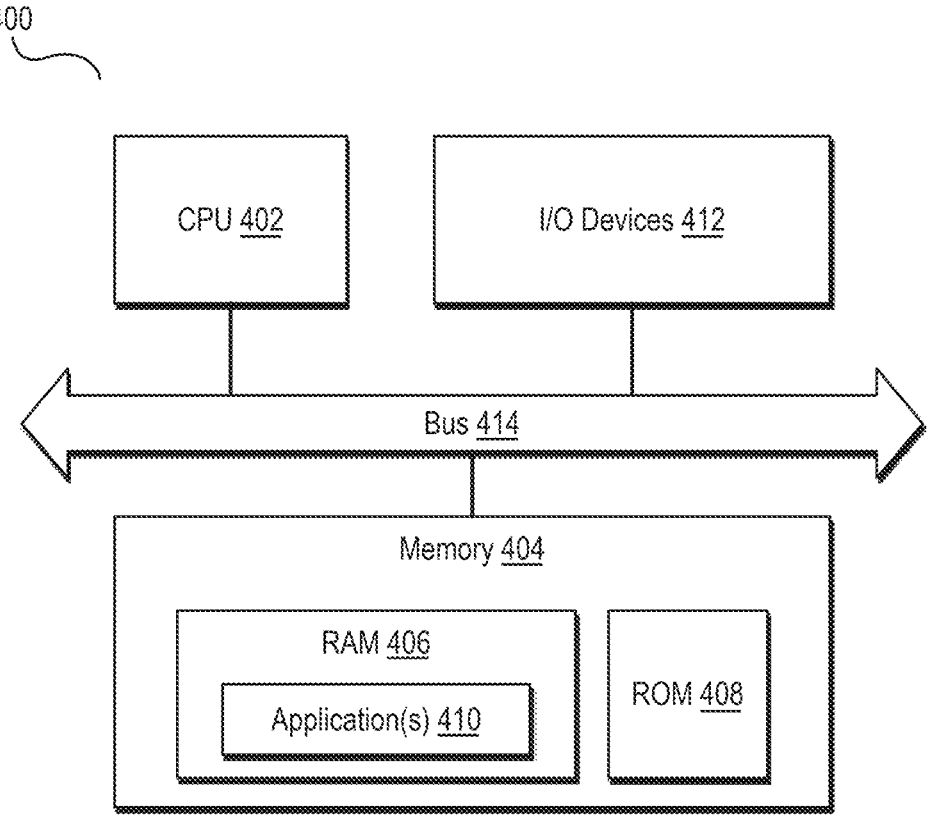
FIG. 4 is a block diagram of a computing device according to some embodiments of the disclosure.

FIG. 4 is a block diagram of a computing device according to some embodiments of the disclosure.

As illustrated, the device 400 includes a processor or central processing unit (CPU) such as CPU 402 in communication with a memory 404 via a bus 414. The device also includes one or more input/output (I/O) or peripheral devices 412. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 402 may comprise a general-purpose CPU. The CPU 402 may comprise a single-core or multiple-core CPU. The CPU 402 may comprise a system-on-a-chip (SoC) or a similar embedded system. In some embodiments, a graphics processing unit (GPU) may be used in place of, or in combination with, a CPU 402. Memory 404 may comprise a memory system including a dynamic random-access memory (DRAM), static random-access memory (SRAM), Flash (e.g., NAND Flash), or combinations thereof. In one embodiment, the bus 414 may comprise a Peripheral Component Interconnect Express (PCIe) bus. In some embodiments, the bus 414 may comprise multiple buses instead of a single bus.

Memory 404 illustrates an example of a non-transitory computer storage media for the storage of information such as computer-readable instructions, data structures, program modules, or other data. Memory 404 can store a basic input/output system (BIOS) in read-only memory (ROM), such as ROM 408 for controlling the low-level operation of the device. The memory can also store an operating system in random-access memory (RAM) for controlling the operation of the device.

Applications 410 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 406 by CPU 402. CPU 402 may then read the software or data from RAM 406, process them, and store them in RAM 406 again.

The device may optionally communicate with a base station (not shown) or directly with another computing device. One or more network interfaces in peripheral devices 412 are sometimes referred to as a transceiver, transceiving device, or network interface card (NIC).

An audio interface in peripheral devices 412 produces and receives audio signals such as the sound of a human voice. For example, an audio interface may be coupled to a speaker and microphone (not shown) to enable telecommunication with others or generate an audio acknowledgment for some action. Displays in peripheral devices 412 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 412 may comprise any input device arranged to receive input from a user. An illuminator in peripheral devices 412 may provide a status indication or provide light. The device can also comprise an input/output interface in peripheral devices 412 for communication with external devices, using communication technologies, such as USB, infrared, Bluetooth®, or the like. A haptic interface in peripheral devices 412 provides tactile feedback to a user of the client device.

A GPS receiver in peripheral devices 412 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), Enhanced Observed Time Difference (E-OTD), Cell Identity (CI), Service Area Identifier (SAI), Estimated Time of Arrival (ETA), Base Station Synchronization (BSS), or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

We claim:

1. A method comprising:

identifying, by a processor, a first set of network elements with less than a first specified percentage of missing data;

removing, by the processor, a second percentage of data associated with each network element in the first set of network elements, to generate a test data set for the each network element in the first set of network elements;

applying, by the processor, a plurality of data fill methods to the test data set to generate a filled data set for each data fill method;

calculating, by the processor, a percentage of missing data successfully filled and an error between the filled data set and the removed second percentage of data for each data fill method;

analyzing, by the processor, relationships between the removed second percentage of data, the calculated percentage of missing data successfully filled, and the error for each data fill method to generate an error curve for each data fill method; and selecting, by the processor, one or more data fill methods to apply to missing data in a network element based on corresponding error curves.

2. The method of claim 1, further comprising analyzing relationships by fitting a curve to the calculated percentage of missing data successfully filled and the error for each data fill method.

3. The method of claim 2, further comprising using the fitted curve to calculate a synthetic data error factor that quantifies a total error introduced by a data fill method.

4. The method of claim 1, further comprising incrementing the second percentage and generating relationships between the removed second percentage of data and the percentage of missing data successfully filled.

5. The method of claim 1, further comprising:

selecting, based on the generated error curves, a first data fill method to apply to a first network element;

applying the first data fill method to missing data in the first network element to generate filled data;

training a machine learning model using the filled data; and evaluating performance of the machine learning model on a test set of data from the first network element.

6. The method of claim 5, further comprising:

determining that the machine learning model's performance is below a predefined threshold; and selecting a different data fill method based on the error curves and re-evaluating the machine learning model's performance.

7. The method of claim 5, wherein selecting the first data fill method comprises selecting the first data fill method based on one or more of the error curve for each data fill method, a computational complexity of each data fill method, a runtime of each data fill method, and characteristics of the first network element.

8. A non-transitory computer-readable storage medium for tangibly storing computer program instructions capable of being executed by a computer processor, the computer program instructions defining steps of:

identifying a first set of network elements with less than a first specified percentage of missing data;

for each network element in the first set of network elements, randomly removing a second percentage of data associated with each network element in the first set of network elements, to generate a test data set;

applying a plurality of data fill methods to the test data set to generate a filled data set for each data fill method;

calculating, for each data fill method, a percentage of missing data successfully filled and an error between the filled data set and the removed second percentage of data;

analyzing relationships between the removed second percentage of data, the calculated percentage of missing data successfully filled, and the error for each data fill method to generate an error curve for each data fill method; and selecting, based on corresponding error curves, one or more data fill methods to apply to missing data in a network element.

9. The non-transitory computer-readable storage medium of claim 8, wherein analyzing relationships includes fitting a curve to the calculated percentage of missing data successfully filled and the error for each data fill method.

10. The non-transitory computer-readable storage medium of claim 9, wherein the fitted curve is used to calculate a synthetic data error factor that quantifies a total error introduced by a data fill method.

11. The non-transitory computer-readable storage medium of claim 8, the steps further comprising incrementing the second percentage and generating relationships between the removed second percentage of data and the percentage of missing data successfully filled.

12. The non-transitory computer-readable storage medium of claim 8, the steps further comprising:

selecting, based on the generated error curves, a first data fill method to apply to a first network element;

applying the first data fill method to missing data in the first network element to generate filled data;

training a machine learning model using the filled data; and evaluating performance of the machine learning model on a test set of data from the first network element.

13. The non-transitory computer-readable storage medium of claim 12, the steps further comprising:

determining that the machine learning model's performance is below a predefined threshold; and selecting a different data fill method based on the error curves and re-evaluating the machine learning model's performance.

14. The non-transitory computer-readable storage medium of claim 12, wherein selecting the first data fill method comprises selecting the first data fill method based on one or more of the error curve for each data fill method, a computational complexity of each data fill method, a runtime of each data fill method, and characteristics of the first network element.

15. A device comprising:

a processor configured to identify a first set of network elements with less than a first specified percentage of missing data;

remove a second percentage of data associated with each network element in the first set of network elements, to generate a test data set for each network element in the first set of network elements;

apply a plurality of data fill methods to the test data set to generate a filled data set for each data fill method;

calculate a percentage of missing data successfully filled and an error between the filled data set and the removed second percentage of data for each data fill method;

analyze relationships between the removed second percentage of data, the calculated percentage of missing data successfully filled, and the error for each data fill method to generate an error curve for each data fill method; and select one or more data fill methods to apply to missing data in a network element based on corresponding error curves.

16. The device of claim 15, wherein analyzing relationships includes fitting a curve to the calculated percentage of missing data successfully filled and the error for each data fill method.

17. The device of claim 16, wherein the fitted curve is used to calculate a synthetic data error factor that quantifies a total error introduced by a data fill method.

18. The device of claim 15, the processor further configured to increment the second percentage and generating relationships between the second percentage of missing data and the percentage of missing data successfully filled.

19. The device of claim 15, the processor further configured to:

select, based on the generated error curves, a first data fill method to apply to a first network element;

apply the first data fill method to missing data in the first network element to generate filled data;

train a machine learning model using the filled data; and evaluate performance of the machine learning model on a test set of data from the first network element.

20. The device of claim 19, the processor further configured to:

determine that the machine learning model's performance is below a predefined threshold; and select a different data fill method based on the error curves and re-evaluating the machine learning model's performance.

* * * * *